United States Patent
Sloan

(10) Patent No.: US 8,742,004 B1
(45) Date of Patent: Jun. 3, 2014

(54) COATING SYSTEM HAVING LONG-TERM DURABILITY AND CHEMICAL RESISTANCE

(71) Applicant: Donald D. Sloan, Platte City, MO (US)

(72) Inventor: Donald D. Sloan, Platte City, MO (US)

( * ) Notice: Subject to any disclaimer, the term of this patent is extended or adjusted under 35 U.S.C. 154(b) by 0 days.

(21) Appl. No.: 13/827,319

(22) Filed: Mar. 14, 2013

(51) Int. Cl.
- C08J 3/03 (2006.01)
- C08J 3/16 (2006.01)
- C08J 3/24 (2006.01)
- C08J 3/00 (2006.01)

(52) U.S. Cl.
USPC ........... 524/516; 524/501; 524/502; 524/507; 524/515; 524/520; 524/503; 528/397; 528/425; 428/421; 428/423.1

(58) Field of Classification Search
USPC ......... 524/516, 501, 502, 507, 515, 520, 523; 528/397, 425; 428/421, 423.1
See application file for complete search history.

(56) References Cited

U.S. PATENT DOCUMENTS

| 6,635,714 B1 | 10/2003 | Wood et al. |
| 8,309,653 B2 | 11/2012 | Goscha et al. |
| 2011/0039077 A1 | 2/2011 | Klemann |

FOREIGN PATENT DOCUMENTS

| EP | 416501 | 3/1991 |

*Primary Examiner* — Duc Truong

(74) *Attorney, Agent, or Firm* — Hovey Williams LLP

(57) ABSTRACT

A highly durable coating composition particularly suited for use on printed articles requiring protection from exposure to the natural elements, chemical exposure, or abrasion. The coating composition generally comprises a fluoropolymer resin, an acrylic polyol resin and a melamine resin. Optionally, a polyisocyanate crosslinking agent may also be included to accelerate curing of the coating.

26 Claims, No Drawings

COATING SYSTEM HAVING LONG-TERM DURABILITY AND CHEMICAL RESISTANCE

BACKGROUND OF THE INVENTION

1. Field of the Invention

The present invention relates to a coating composition comprising a fluoropolymer resin, an acrylic polyol resin and a melamine resin. The coating composition, when applied and cured upon a substrate, forms an extremely durable protective coating. The resultant coating is highly weather and chemical resistant, in addition to providing superior abrasion protection.

2. Description of the Prior Art

It can be highly desirable, from marketing and aesthetic perspectives, for example, to provide printed graphics on various articles of manufacture. However, many conventional ink systems are not capable of providing the necessary level of resistance to damage that may be encountered during use of the article to avoid unacceptable marring of the printed graphic. Thus, top coating compositions have been employed in an attempt to preserve the integrity of the printed graphic under physically demanding conditions in which the article may be routinely used.

Some top coating compositions may prove effective in protecting the underlying graphic from outdoor exposure, but fail to adequately provide resistance to chemical exposure, such as to various organic solvents. Some top coating compositions may provide good solvent resistance, but may yellow or turn cloudy upon prolonged exposure to the elements thus degrading the quality of the printed graphics. Moreover, adhesion of the coating to a variety of surfaces, particularly surfaces containing printed graphics is a challenge in its own right apart from other physical performance characteristics.

Without question, there is a need in the art for coating compositions that are capable of providing excellent protection for a graphic image under a wide variety of heavy use conditions. For example, in automotive or marine vehicle applications, it may be desirable to manufacture vehicle body parts with graphics printed thereon, as opposed to applying the graphics post-manufacture as a decal. Any top coating for the part bearing the graphics would need to be highly weather resistant due, highly chemical resistant as the part may come into contact with various fluids required for operation of the vehicle (e.g., gasoline, diesel, cleaning agents, and the like). Moreover, the coating would need to be resistant to abrasions, such as sand, brush, or gravel) that would be routinely encountered during use of the vehicle.

SUMMARY OF THE INVENTION

The present invention overcomes the aforementioned problems by providing protective coating compositions that are highly weather resistant, chemical resistant, and resistant to damage by abrasion, while also adhering well to a variety of substrates. According to one embodiment of the present invention, a water-based coating composition is provided that, upon curing, forms a highly durable coating. The coating composition comprises an acrylic polyol resin, a fluoropolymer resin, a melamine resin, and optionally, a water-dispersible polyisocyanate crosslinking agent.

According to another embodiment of the present invention, a water-based coating composition is provided that, upon curing, forms a highly durable coating. The coating composition comprises between about 10% to about 40% by weight of one or more acrylic resins, between about 10% to about 40% by weight of one or more fluoropolymer resins, between about 3% to about 15% by weight of one or more melamine resins, and between about 2% to about 10% by weight of an water-dispersible isocyanate crosslinking agent.

According to still another embodiment of the present invention, a method of protecting an image printed upon a substrate is provided. The method comprises providing a substrate having an ink image printed thereon. A clear top coat composition is applied to the substrate over at least a portion of the ink image. The clear top coat composition comprises an acrylic polyol resin, a fluoropolymer resin, a melamine resin, and optionally, a water-dispersible polyisocyanate. The clear top coat composition is cured on the substrate to form a protective coating thereon.

DETAILED DESCRIPTION OF THE PREFERRED EMBODIMENT

Compositions according to the present invention can be provided as one or two-part systems capable of being applied through a variety of application techniques as well as being cured through multiple mechanisms. Generally, though, compositions according to the present invention are water-based and comprise a fluoropolymer resin, an acrylic polyol resin, and a melamine resin. Depending upon the desired curing mechanism for the coating, the composition may also be comprise a water-dispersible polyisocyanate crosslinking agent.

In certain embodiments, the fluoropolymer resin comprises a polymer having alternating fluoroethylene and alkyl vinyl ether segments. The fluorinated segments function to provide UV stability, weather resistance, and chemical resistance, while the vinyl ether segments provide solvent compatibility and cross-linking sites. In particular embodiments, the fluoropolymer resin is provided as a water-based dispersion, comprising between about 30% to about 50% by weight solids. In order to provide flexibility in terms of application methods, the fluoropolymer resin solids may present relatively small average particle diameters, preferably between about 0.05 to about 0.15 μm. The fluoropolymer resins may also be capable of crosslinking with water-dispersible isocyanates and curable at ambient temperatures. In certain embodiments, the fluoropolymer resin may have a $T_g$ of between about 25° C. to about 40° C., and a hydroxyl value of between about 50 to about 100 (mg KOH/g resin), or between about 70 to about 90. In certain embodiments, the fluoropolymer resin may be present in the coating composition at a level of between about 10% to about 40% by weight, between about 15% to about 35% by weight, or between about 20% to about 30% by weight.

The coating compositions also comprise an acrylic-based polymer resin. In certain embodiments, this resin is a water-dispersible acrylic polyol resin. The acrylic polyol resin may comprise between about 1% to about 8% OH, or between about 2% to about 5% OH. In particular embodiments, the acrylic polyol resin may have a hydroxy equivalent weight (HEW) of between about 300 to about 800, between about 400 to about 700 or between about 500 to about 600. In still other embodiments, the acrylic polyol resin may have an acid value of between about 5 to about 15, about 7 to about 13, or about 9 to about 11. The acrylic polyol resin may be provided as an emulsion comprising between about 40% to about 50% by weight solids. The continuous phase of the emulsion predominantly may comprise water and minor amounts of organic solvent or coalescing agents such as butyl glycol and solvent naphtha (e.g., Solvesso 100). In certain embodiments, the acrylic polyol resin may be present in the coating composition at a level of between about 10% to about 40% by weight, between about 15% to about 35% by weight, or between about 20% to about 30% by weight. An exemplary acrylic polyol resin that may be used with the coatings described herein is SETAQUA 6517 from Nuplex Resins.

The coating compositions further comprise a melamine resin. In certain embodiments, the melamine resin can be a methylated high imino melamine resin. Such resins are partially methoxylated and highly alkylated, which result in resins containing a significant concentration of alkoxy/imino or high NH functionality. In particular embodiments, the melamine resin has a practical equivalent weight of between about 180 to about 240. The melamine resin may be present in the coating composition at a level of between about 3% to about 15% by weight, between about 4% to about 10% by weight, or between about 5% to about 8% by weight. Exemplary melamine resins that may be used with the coatings described herein include various high imino resins under the name CYMEL from Cytec Industries, Inc., and particularly CYMEL 385.

As noted above, the instant coating compositions can be formulated as a one-part or two-part system depending upon the intended curing mechanism to be employed. In some embodiments, the primary difference between these two systems is the presence of a crosslinking agent. A one-part system, typically, will not include a crosslinking agent and may require the application of heat and/or forced air (e.g., through a baking operation) in order to cure within a commercially acceptable time frame. A two-part system may be capable of curing without the addition of heat and/or forced air, although such may be utilized in order to further enhance curing speed. With two part systems, the crosslinking agent is maintained separate from the rest of the coating formulation until just prior to application to the substrate, as the crosslinking agent may spontaneously react with the other coating components thereby initiating fairly rapid curing of the coating. In such embodiments, it is desirable to avoid mixing the crosslinking agent and other coating components no earlier than 8 hours prior to use. In other embodiments, mixing should occur no earlier than 6 hours, 4 hours, or 2 hours prior to use.

In other embodiments, such as when the coating is to be applied by an inkjet printing system, a dual-head inkjet printing system can be used, such as described in U.S. Pat. No. 8,092,003, incorporated by reference herein in its entirety. In such a dual-head system, the crosslinking agent is maintained separate from the rest of the coating formulation while within the array of printing heads. Particularly, the crosslinking agent and the coating formulation may be discharged from separate printer heads such that no mixing of the two occurs until after discharge. In still other embodiments, the crosslinking agent may be applied via means different from those in which the remainder of the coating is applied. For example, that portion of the coating composition comprising the acrylic polyol resin, the fluoropolymer resin, and the melamine resin may be applied to the substrate via an inkjet printer, and the crosslinking agent subsequently applied by an separate spraying operation. It is also within the scope of the present invention for the crosslinking agent to be applied to the substrate first, followed by the remainder of the coating composition.

In certain embodiments, the crosslinking agent is a water-dispersible polyisocyanate compound. The polyisocyanate may be based upon hexamethylene diisocyanate (HDI) repeat units. In particular embodiments, the polyisocyanate has an average equivalent weight of between about 200 to about 280, or between about 220 to about 260. Also, in certain embodiments, the polyisocyanate comprises an NCO content of between about 12% to about 20%, or between about 15% to about 18%. When present, the crosslinking may comprise between about 2% to about 10% by weight, between about 4% to about 8%, or between about 5% to about 7% by weight of the total coating composition formula. Exemplary crosslinking agents include those sold under the name BAYHYDUR, and particularly BAYHYDUR 302 available from Bayer MaterialScience.

The coating compositions may also comprise another of additional components utilized to adjust the physical characteristics and performance of the coating composition during handling and application. In certain embodiments, the coating composition may include a coalescing agent. The coalescing agent can be an ester alcohol, biodegradable, and/or low in VOC content. The coalescing agent may be present in the coating composition at a level of between about 2% to about 12% by weight, between about 4% to about 10% by weight, or between about 5.5% to about 8% by weight. An exemplary alcohol ester coalescing agent is 2,2,4-trimethyl-1,3-pentanediol monoisobutyrate, available from Eastman Chemical under the name TEXANOL.

The coating compositions may also include a surfactant to improve flow, leveling, surface appearance, and/or reduce foaming. In one embodiment, the surfactant is a nonionic fluorosurfactant, such as a nonionic fluorinated polyether. The fluorosurfactant may be present in the coating composition at a level of between about 0.1 to about 1.5% by weight, or between about 0.5% to about 1.0% by weight.

While the coating composition is particularly suited for use as a clear coat, it is within the scope of the present invention for the coating compositions to comprise a colorant such as a pigment. Thus, the pigmented coating compositions can be used in the creation of the printed image itself thereby obviating the need for a clear top coat layer. However, the coating composition is suited for use in conjunction with nearly any ink system and exhibits excellent adhesion to a wide variety of surfaces and surface treatments.

The coating composition exhibits excellent adhesion characteristics to numerous and varied substrates including ceramic, metals (e.g., stainless steel, cold rolled steel, and tin), glass, acrylic sheeting, melamine laminate sheeting (e.g., FORMICA), polypropylene (e.g., COROPLAST), and polycarbonate. The substrate may be provided with a base primer coating to promote adhesion of the ink and top coat thereto. In certain embodiments, the primer coating itself is "water-white" and thus does not affect the coloration of the substrate nor the ink or top coat applied thereto.

Upon provision of the substrate (primed or unprimed), the image may be printed thereupon. As noted previously, nearly any ink system may be used to print the image and any number of printing techniques may be employed. For example, the image may be printed by roller coating, flexographic printing, screen printing, lithographic, or inkjet printing techniques. After printing, the image is cured using a curing method appropriate to the particular ink (e.g., baking, exposure to UV radiation, forced air, etc.). Next, the coating composition made in accordance with any embodiment of the present invention described above can then be applied over the image and cured to provide a protective coating.

The coating composition can be applied via roller coating, spraying, screen printing, or digital printing, for example. The physical characteristic of the coating (including solid particle sizes and viscosity) may need to be adjusted depending upon the desired method of application. For instance, if the coating composition is to be applied via an inkjet printer, the solid particle sizes should be sufficiently small and viscosity sufficiently low to permit ejection through the inkjet nozzles without clogging the same. In certain embodiments, the coating composition may be applied using 50 to 80 μL drop-size printheads. The viscosity of the coating composition in such embodiments should also be between about 10 cp to about 25 cp. Irrespective of the method of application, in certain embodiments, the coating composition is applied in a sufficient quantity to provide a final thickness of at least 1.5 mil, between about 1.5 to about 5 mil, or between about 2 to about 4 mil.

Following application, the coating composition is cured to form the protective top coat layer. Options for curing are varied and will depend to great degree on a number of parameters including whether a crosslinking agent is used, desired cure speed and heat sensitivity of the substrate. In certain embodiments, curing can be effected merely by permitting the coated substrate to rest under ambient conditions (e.g., room temperature). Curing under these conditions may progress slowly and take up to 24 hours, but no further energy input is required. If ambient curing is desired, the inclusion of a crosslinking agent, and thus use of a two-part coating system, can be preferred to help shorten the overall cure time. Additional operations can be used to accelerate the curing cycle. For example, heat, such as supplied by a forced air oven or heat lamps, can be used to shorten cure times. The temperature of any baking cycle will depend somewhat on the heat-sensitivity of the substrate bearing the printed image and top coat. However, the coating itself can easily tolerate air temperatures of up to about 350° F., between about 100° F. to about 350° F., or between about 150° F. to about 300° F. When the use of heat is available to accelerate curing of the coating composition, a one-part system (no crosslinking agent) or two-part system (with crosslinking agent) can be employed.

Once the top coat has cured, the protected substrate can be processed in a number of ways in furtherance of final manufacture of a particular article. For example, the protected substrate may be embossed or thermoformed to provide articles of various textures or three-dimensional shapes. In certain embodiments, the finished article may be an outdoor sign, an automotive body part, parts of an appliance, or any article whose use requires that the part withstand exposure to the natural elements.

As noted above, coating compositions according to the present invention are generally highly durable and exhibit excellent weatherability and chemical resistance characteristics. In certain embodiments, the coating compositions exhibit excellent adhesion characteristics as determined by ASTM D3359 Standard Test Methods for Measure Adhesion by Tape Test. Generally, this test method involves applying a layer of the coating composition to a particular substrate creating a lattice pattern of cuts in the cured coating, applying a pressure-sensitive tape over the lattice, and removing the lattice. Performance is then judged by how much, if any, of the coating was removed from the lattice by the tape. In particular embodiments according to the present invention, less than 5% of the coating is removed by the tape, and more preferably, none of the coating is removed by the tape. In this particular test, the coating is deposited and cured on the substrate to form a film of at least 1.0 mil thickness. The substrate used in the adhesion test may vary from rigid plastic substrates like polyethylene, polycarbonate, corrugated polyethylene, PET, HDPE, flexible vinyl films such as those used for vehicle wraps, and metallic substrates. It is noted that for the purposes of the physical performance tests described herein (e.g., various adhesion and resistance tests), a pigment, dye or other colorant may be added to the coating composition to aid visual inspection of the coating's performance.

The adhesion test may be extended to include additional challenges, such as following exposure to humidity, QUV accelerated weathering, heat aging, water immersion, and xenon arc testing. For example, the test substrate prepared as described above, may be exposed to high humidity conditions as described in ASTM D4585 for 500 hours. In addition to resisting delamination from the substrate due to the humid conditions, the substrate following the humidity testing also passes the cross-hatch adhesion test described above.

In certain embodiments, the substrate prepared as described above, can also withstand 500 hours of QUV accelerated weathering testing according to ASTM G154 without signs of delamination. This same substrate, after QUV accelerated weathering testing also passes the cross-hatch adhesion test.

In certain embodiments, the substrate prepared as described above can withstand 500 hours of exposure to 190° F. temperatures without signs of cracking or delamination from the substrate. This same substrate, after elevated temperature exposure, also passes the cross-hatch adhesion test.

In certain embodiments, the substrate prepared as described above can withstand immersion in 90° F. water for 96 hours in a circulating bath without exhibiting signs of delamination from the substrate. This same substrate, after undergoing this water immersion challenge, also passes the cross-hatch adhesion test.

In certain embodiments, the substrate prepared as described above can withstand testing according to SAE J1885, 1000 kJ, Accelerated Exposure of Automotive Interior Trim Components Using a Controlled Irradiance Xenon-Arc Apparatus. This same substrate, after undergoing the xenon-arc testing, also passes the cross-hatch adhesion test.

In certain embodiments, the substrate prepared as described above can also pass a Taber abrasion test of 3000 cycles using a 500 gram load CS 10 wheel with substantially no change in % haze or no appreciable weight loss.

In certain embodiments, the substrate prepared as described above exhibits excellent chemical and stain resistance. For example, when tested according to ASTM D1308, Standard Test Method for Effect of Household Chemicals on Clear and Pigmented Organic Finishes, using WINDEX-brand window cleaner, MR. CLEAN-brand cleanser, coffee, tea, and cola, 24 hour exposure, the substrate passes without signs of damage to the coating. Moreover, the prepared substrate is also resistant to a variety of aggressive solvents and chemicals such methylethyl ketone, automotive starting fluid, acetone, ethyl alcohol, isopropyl alcohol, heptane, vinyl acetate, ether, lacquer thinner, butyl cellosolve, windshield washer fluid, vinyl cleaner, gasoline, PLEDGE-brand furniture polish, ethylene glycol and propylene glycol anti-freeze, kerosene, FORMULA 409-brand cleanser, sulfuric acid, ammonia, SPIC & SPAN-brand cleanser, potassium sulfate, chlorine, WD-40-brand lubricant, brake fluid (DOT 3), aluminum chloride, oven cleaner, rust remover, caustic soda, ARMOR-ALL-brand protectant, black streak remover, silicone lubricant, and furniture stripper. Specifically, the coating composition can be tested in accordance with ASTM D5402, and withstand at least 10, or even at least 50, rubs with a cloth or wad of cotton soaked with any of the aforementioned materials without showing visible signs of the coating being removed from the substrate.

EXAMPLE

The following example sets forth an exemplary coating composition made in accordance with the present invention. It is to be understood, however, that this example is provided

| Rollcoat clear | |
| --- | --- |
| Component | Amount (wt. %) |
| Part A | |
| Acrylic polyol emulsion (SETAQUA 6517, 43-47% solids) | 39.57% |
| Fluoropolymer resin (40% solids) | 39.57% |
| 2,2,4-trimethyl-1,3-pentanediol monoisobutyrate (TEXANOL) | 6.4% |
| Melamine resin (CYMEL 385) | 7.67% |
| Nonionic fluorosurfactant (POLYFOX PF 159) | 0.76% |
| Part B | |
| Polyisocyanate catalyst (BAYHYDUR 302) | 6.0% |

I claim:

1. A water-based coating composition that, upon curing, forms a highly durable coating, said coating composition comprising:
    an acrylic polyol resin;
    a fluoropolymer resin;
    a melamine resin; and
    optionally, a water-dispersible polyisocyanate crosslinking agent.

2. The coating composition according to claim 1, wherein said fluoropolymer resin comprises alternating fluoroethylene and alkyl vinyl ether segments.

3. The coating composition according to claim 1, wherein said melamine resin is a methylated melamine resin.

4. The coating composition according to claim 1, wherein said composition comprises said water-dispersible polyisocyanate.

5. The coating composition according to claim 4, wherein said polyisocyanate crosslinking agent is based upon hexamethylene diisocyanate.

6. The coating composition according to claim 1, wherein said composition further comprises an ester alcohol coalescing agent.

7. The coating composition according to claim 6, wherein said ester alcohol coalescing agent comprises 2,2,4-trimethyl-1,3-pentanediol monoisobutyrate.

8. The coating composition according to claim 1, wherein said composition further comprises a nonionic fluorosurfactant.

9. The coating composition according to claim 1, wherein said composition is an un-pigmented clear-coat composition.

10. A water-based coating composition that, upon curing, forms a highly durable coating, said coating composition comprising:
    between about 10% to about 40% by weight of one or more acrylic resins;
    between about 10% to about 40% by weight of one or more fluoropolymer resins;
    between about 3% to about 15% by weight of one or more melamine resins; and
    between about 2% to about 10% by weight of an water-dispersible isocyanate crosslinking agent.

11. The composition according to claim 10, wherein said composition further comprises between about 2% to about 12% by weight of an ester alcohol coalescing agent.

12. The composition according to claim 10, wherein said composition further comprises between about 0.1 to about 1.5% by weight of a nonionic fluorosurfactant.

13. The composition according to claim 10, wherein said one or more fluoropolymer resins comprises alternating fluoroethylene and alkyl vinyl ether segments.

14. A method of protecting an image printed upon a substrate comprising:
    providing a substrate having an ink image printed thereon;
    applying a clear top coat composition to said substrate over at least a portion of said ink image, said clear top coat composition comprising an acrylic polyol resin, a fluoropolymer resin, a melamine resin, and optionally, a water-dispersible polyisocyanate; and
    curing said clear top coat composition on said substrate to form a protective coating thereon.

15. The method according to claim 14, wherein said substrate comprises a primer coating that was applied thereto prior to printing of said ink image thereon.

16. The method according to claim 15, wherein said primer coating comprises a waterborne acrylic resin.

17. The method according to claim 14, wherein said substrate is embossed after printing of said ink image thereon.

18. The method according to claim 14, wherein said clear top coat composition is applied to said substrate by roller coating, screen printing, spraying, or digital printing.

19. The method according to claim 18, wherein said clear top coat composition comprises said water-dispersible polyisocyanate and is applied to said substrate through a digital printing operation.

20. The method according to claim 19, wherein said digital printing operation comprises a dual-head inkjet printing system in which said water-dispersible polyisocyanate is discharged toward said substrate from a separate printer head than said acrylic polyol resin, said fluoropolymer resin, and said melamine resin, and thus does not come into contact with said acrylic polyol resin, said fluoropolymer resin, and said melamine resin until discharged.

21. The method according to claim 18, wherein said clear top coat composition comprises said water-dispersible polyisocyanate, which is mixed with said acrylic polyol resin, said fluoropolymer resin, and said melamine resin no earlier than 8 hours prior to application of said clear top coat composition to said substrate.

22. The method according to claim 14, wherein said curing step comprises passing said substrate including said clear top coat composition through forced air drying apparatus.

23. The method according to claim 22, wherein said clear top coat composition does not include said water-dispersible polyisocyanate.

24. The method according to claim 14, wherein said curing step comprises baking said substrate including said clear top coat composition at a temperature of at least 150° F. for at least 30 seconds.

25. The method according to claim 14, wherein said clear top coat composition comprises said water-dispersible polyisocyanate, and said curing step comprises allowing said substrate including said clear top coat composition to dry at ambient temperature conditions without application of heat.

26. The method according to claim 14, wherein said substrate comprises a member selected from the group consisting of ceramic, stainless steel, melamine laminate sheet material, tin, cold rolled steel, polycarbonate, polypropylene, polyethylene, acrylic sheeting, and glass.

* * * * *